United States Patent [19]

Chapman et al.

[11] Patent Number: 5,352,716
[45] Date of Patent: Oct. 4, 1994

[54] DEGRADABLE SYNTHETIC POLYMERIC COMPOUNDS

[75] Inventors: Graham M. Chapman; Robert H. Downie, both of Williamsville, N.Y.

[73] Assignee: Ecostar International, L.P., Tonawanda, N.Y.

[21] Appl. No.: 991,320

[22] Filed: Dec. 16, 1992

[51] Int. Cl.$^5$ ............................................. C08K 3/20
[52] U.S. Cl. ..................................... 523/128; 523/126
[58] Field of Search ........................................ 523/128

[56] References Cited

U.S. PATENT DOCUMENTS

| | | | |
|---|---|---|---|
| 3,632,687 | 1/1972 | Walter et al. | 260/896 |
| 3,734,979 | 5/1973 | Koleske et al. | 260/897 R |
| 3,852,913 | 12/1974 | Clendinning et al. | 47/37 |
| 3,867,324 | 2/1975 | Clendinning et al. | 260/23 H |
| 3,919,163 | 11/1975 | Clendinning et al. | 260/40 R |
| 3,935,308 | 1/1976 | Wise et al. | 424/78 |
| 3,981,856 | 9/1976 | Hudgin et al. | 526/4 |
| 4,021,388 | 5/1977 | Griffin | 260/13 |
| 4,125,495 | 11/1978 | Griffin | 260/17.4 ST |
| 4,133,784 | 1/1979 | Otey et al. | 260/17.4 ST |
| 4,156,666 | 5/1979 | Odate et al. | 524/456 |
| 4,218,350 | 7/1980 | Griffin | 260/17.4 ST |
| 4,306,552 | 12/1981 | Gregory | 128/156 |
| 4,324,709 | 4/1982 | Griffin | 523/210 |
| 4,337,181 | 6/1982 | Otey et al. | 523/128 |
| 4,379,138 | 4/1983 | Pitt et al. | 424/78 |
| 4,420,576 | 12/1983 | Griffin | 524/47 |
| 4,454,268 | 6/1984 | Otey et al. | 524/47 |
| 4,461,853 | 7/1984 | Gilead et al. | 523/126 |
| 4,477,654 | 10/1984 | Holmes et al. | 528/361 |
| 4,673,438 | 6/1987 | Wittwer et al. | 106/126 |
| 4,863,655 | 9/1989 | Lacourse et al. | 264/53 |
| 4,931,488 | 6/1990 | Chiquet | 523/126 |
| 4,983,651 | 1/1991 | Griffin | 524/47 |
| 5,026,745 | 6/1991 | Weil | 524/47 |
| 5,087,650 | 2/1992 | Willett | 524/47 |
| 5,095,054 | 3/1992 | Lay et al. | 524/47 |

FOREIGN PATENT DOCUMENTS

| | | |
|---|---|---|
| 0327505 | 1/1989 | European Pat. Off. . |
| 0400532 | 5/1989 | European Pat. Off. . |
| 0400531 | 5/1990 | European Pat. Off. . |
| 0417828 | 8/1990 | European Pat. Off. . |
| 9004519 | 10/1989 | PCT Int'l Appl. . |
| WO9001043 | 2/1990 | PCT Int'l Appl. . |
| WO9005161 | 5/1990 | PCT Int'l Appl. . |
| WO9010671 | 9/1990 | PCT Int'l Appl. . |
| WO9013576 | 11/1990 | PCT Int'l Appl. . |
| WO9014388 | 11/1990 | PCT Int'l Appl. . |
| WO9015843 | 12/1990 | PCT Int'l Appl. . |
| WO9102023 | 2/1991 | PCT Int'l Appl. . |
| WO9102024 | 2/1991 | PCT Int'l Appl. . |
| WO9102025 | 2/1991 | PCT Int'l Appl. . |

*Primary Examiner*—Paul R. Michl
*Assistant Examiner*—Edward Cain
*Attorney, Agent, or Firm*—Hodgson, Russ, Andrews, Woods & Goodyear

[57] ABSTRACT

A synthetic thermoplastic polymeric compound is structurally stable during its useful life and which upon introduction into a suitable environment, degrades under chemical, photochemical and biodegradation mechanisms into innocuous products. Stabilizers may be incorporated into the thermoplastic polymer to help maintain the structural and functional integrity through the useful life of the product. Degradation is then brought about by the synergistic interaction of the biodegradable component, an oxidizable component, transition metal additives and an aromatic ketone incorporated into the thermoplastic polymer. In the degradation process, the biodegradable component is metabolized to expose the thermoplastic polymer surface to chemical attack. In addition, the oxidizable component in conjunction with the catalytic system effects oxidative breakdown of the thermoplastic polymer to give lower molecular weight fragments that are susceptible to enzymatic attack in the decomposition environment. The result is the complete breakdown of the thermoplastic polymer into innocuous products. The chemical, photochemcial, and biodegradation mechanisms comprising the degradation process occur both sequentially and simultaneously in cooperative, synergistic action to bring about the desired result.

28 Claims, No Drawings

DEGRADABLE SYNTHETIC POLYMERIC COMPOUNDS

FIELD OF THE INVENTION

The present invention relates to degradable synthetic polymeric compounds. These degradable compounds comprise a thermoplastic polymeric component or components combined with a directly biodegradable component and other additives including an oxidizable component, transition metal additives and an aromatic ketone. The additives in conjunction with the directly biodegradable component have a synergistic effect that accelerates the degradation breakdown of the thermoplastic component under chemical, photochemical and biodegradation mechanisms into innocuous products upon introduction of the degradable compound into a suitable environment, such as soil burial, composting, and underwater disposal. The thermoplastic components include polar polymers, non-polar polymers, copolymers and graft copolymers which chemically breakdown and are then metabolized to form water, carbon dioxide and bio-mass as the innocuous products. The synthetic polymeric compound further can include a stabilizing component that delays the initiation of the degradation process until completion of the useful life of the compound.

BACKGROUND OF THE INVENTION

Synthetic polymeric thermoplastic compounds have found widespread application as packaging materials, packing materials, and as molded articles and the like, replacing many traditional materials such as paper, wood, steel, and aluminum. A problem that is growing increasingly acute is how to treat these thermoplastics after their useful life is finished. In many situations, the immediate solution is to landfill the thermoplastics or to recycle. However, disposing of thermoplastics along with other trash and garbage as refuse is seen as wasteful, while on the other hand, for many applications recycling is not an economic or practical option. The alternatives are to combine the used thermoplastics with other organic materials in a composting facility, subject the plastic material to soil burial, or to submerge the thermoplastics in underwater disposal.

As a solution, the present invention describes a process for formulating the thermoplastics with a directly biodegradable component and other additives to provide a degradable synthetic polymeric compound. This compound is vulnerable to chemical, photochemical, and biodegradation mechanisms brought about by inclusion of the compound into a suitable degradation environment, such as in a composting facility, in soil burial, or submersion of the thermoplastics. Then, after a period of time, which is considerably less than if the synthetic polymeric compound were not so formulated, the only products that will remain will be innocuous products devoid of their original structure, or the compound will be assimilated into biomass.

It is therefore an object of the present invention to provide an improved degradable synthetic polymeric thermoplastic compound. This synthetic compound needs to be suitable for use as a packaging material, packing material, or as a blow molded or injection-molded object and the like, and then, upon completion of its useful life, suitable for soil burial or water disposal or inclusion in a composting facility where the compound will undergo degradative breakdown to reduce the thermoplastic component to innocuous by-products. This requires that the synthetic polymeric compound maintain its structural integrity while it is being used for its intended purpose and then, upon completion of that purpose, break down under the action of degradation mechanisms occurring in suitable environments, and in a relatively short period of time. Towards this end, incorporation of an anti-oxidant or stabilizing component, which is active over a limited period of time to retard commencement of the start of the degradation process, may be preferred. Then, on depletion of part of the anti-oxidant or stabilizing component and in the presence of an oxidizable component, degradative change of the thermoplastic polymers into lower molecular weight fragments begins.

Along its path from useful article to innocuous products, the synthetic polymeric compound undergoes three degradation stages. These stages are not necessarily sequential, but can occur simultaneously in cooperative action to bring about the resultant degradation. The first stage is biological removal of the directly biodegradable component or components which results in a mass reduction of the synthetic polymeric compound to give a highly porous material. In some cases, this leads to fragmentation of the synthetic compound to form polymeric dust. The enhanced porosity increases the exposed surface area of the long chain hydrocarbons and/or synthetic polymers and renders them more vulnerable to chemical attack. The second stage is chemical and results in an oxidative shortening of the long chain polymers to decrease their molecular weight. At some point, the third stage begins with the biological metabolism of the low molecular weight fragments. The synthetic polymeric compounds of the present invention thus preferably include a directly biodegradable component, stabilizing component having a limited effective period and an oxidizable component. The latter generates a peroxide or a hydroperoxide that serves to oxidize the many carbon-to-carbon linkages of the polymer under the influence of a natural decomposition environment after the limited effective period of the stabilizing component has ceased.

Preferred oxidizable materials are unsaturated polymer-soluble compounds such as derivatives of unsaturated fatty acids that contain at least one double bond per molecule, e.g. esters or natural fats themselves or other unsaturated materials, such as unsaturated rubber. The oxidation of compounds such as fats can be catalyzed by transition metals such as iron. An aromatic ketone is a preferred additive because it has a synergistic effect on the oxidation reactions. The aromatic ketone is also useful as a photodegradation enhancer.

DETAILED DESCRIPTION OF THE INVENTION

In preparing a degradable synthetic polymeric compound, a directly biodegradable component and a thermoplastic polymeric component are combined with additives having a synergistic affect on the degradation of the thermoplastic component. Degradation of the directly biodegradable component provides the first stage mass reduction of the synthetic polymeric compound and is generally carried out using a polysaccharide compound, such as starch, although other known directly biodegradable materials such as cellulose, other glucose derivatives, polyesters, etc. are contemplated by the scope of the present invention. Depending on the mix ratio, the biodegradable component can serve as a filler in the thermoplastic compound or as the predominant component of the compound. Starch or the other directly biodegradable compounds are essentially eliminated by the process of enzymatic reaction and then the resultant material is leached away to expose further starch. This is followed by successive elimination of the newly laid open surfaces at the interior to produce a porous and fragmented structure that is more readily attacked by the processes of oxidation, hydrolysis, direct enzyme action or combinations of these processes during the subsequent stages of degradation. The result is that the total mass of the synthetic polymeric compound is reduced after completion of the first stage due to loss of the directly biodegradable component.

In addition to starch, the directly biodegradable component may be cellulose or derivatives of cellulose, polycaprolactone, polylactic acid and other polyesters or other materials which have functional groups that are suitable for use with hydrocarbon monomers comprising the thermoplastic polymer while retaining their inherent biodegradability characteristic. The directly biodegradable component is present in the thermoplastic polymer in an amount of from about 2% to 95%, by weight. For example, when the directly biodegradable component is starch in a granular form, it is present in an amount of from about 2% to 75% by weight, and preferably for a physically modified starch, the concentration can be as high as 95% by weight.

Granular starches are essentially non-modified "Pearl" starches and include as for example carbohydrates of natural, vegetable origin, composed mainly of amylose (linear) and/or amylopectin (branched). They can be extracted from various plants, such as corn (maize), rice, potatoes, tapioca, pea, rye, oats, and wheat. Potatoes, corn and rice are the preferred sources for starch with corn starch being most preferred because of its cost. However, if the final product is contemplated to be a very thin (less than 0.13 mm film), rice starch may be preferred due to its small average particle size.

Physically modified starches are used to increase the percentage of the directly biodegradable component to be included in the synthetic polymeric compound. These starches include gelatinized starch or destructured starch, or starch that has a modified acidity (pH) where a mild acid has been added. The mild acid lowers the starch acid value to between about 3 to 6, as is well known to those skilled in the art.

Gelatinization is brought about by heating the starch in the presence of excess water or an aqueous solution at temperatures above about 60° C. until the starch granules are sufficiently swollen and disrupted so that they form a smooth viscous dispersion in water. Preferably the gelatinized starch is then combined with a water dispersible plasticizer and/or with a water dispersible, thermoplastic polar polymer such as ethylene acrylic acid copolymer (EAA), in the presence of heat. EAA copolymer compounds are relatively expensive and their inclusion in the synthetic thermoplastic compound is preferably held in the range of at least 10% to a maximum of 90% (dry weight). When the intended use of the degradable synthetic polymeric compound is a packaging application, such as a blown or extruded film, an olefinic polymer can be added to tailor the polymeric compound to have an increased processability and functionality. In that case, the preferred amount of EAA is in the range of about 10% to 30% by weight depending on the proportion of the olefin compound. Suitable plasticizers include polyethylene glycol, ethylene glycol, propylene glycol, sorbitol and glycerine.

Starch is destructured by heat treatment above the glass transition temperatures and melting points of its components so that the starch compound is subjected to an endothermic transition that produces a consequent disorder in the molecular structure of the starch granules. Destructuring is preferably carried out before the thermoplastic component is added and in the absence of added water. The intrinsic water content of starch is generally between about 10 to 13 percent. Subsequently, during the destructuring process, a low-melting thermoplastic polar polymer, such as EAA copolymer may be added to the starch to increase the tensile strength of the resulting synthetic compound. A normally stable, chemically saturated thermoplastic polymer, such as an olefinic polymer, can also be added as desired to tailor the resulting compound to a specific application.

The destructuring process may also be carried out in the presence of a high-boiling plasticizer. This is similar to the gelatinization process for starch and is especially desirable when the final synthetic thermoplastic compound will have a relatively high starch content, e.g. greater than 50 percent starch. Starch destructured in the absence of added water with a plasticizer produces a composition that can be processed at temperatures higher than 120° C. without bubble formation and which can be extruded at low pressures without problems due to volatile substances. Suitable plasticizers have been previously mentioned.

Examples of thermoplastic polymers that are useful in the present invention include polyurethane (PU), polystyrene (PS) and polyolefins, such as polypropylene (PP) and polyethylene (PE) including low-density polyethylene (LDPE), high-density polyethylene (HDPE), medium-density polyethylene (MDPE), linear low density polyethylene (LL), and high molecular weight polyethylene (HMW). These synthetic compounds are water-insoluble and must be blended with the biodegradable component under condition of heat to obtain a mix.

Further included as examples of thermoplastic polar polymers are copolymers such as ethylene/vinyl acetate-copolymers (EVA), ethylene/vinyl alcohol-copolymer (EVAL), ethylene/acrylic acid-copolymers (EAA), ethylene/methyl acrylate-copolymers (EMAC), ethylene methacrylic acid copolymer (EMAA), ethylene vinyl alcohol (EVAL), polyvinyl alcohol (PVOH), ethylene vinyl alcohol carbon monoxide copolymer (EVACO), ethylene butylacrylate (EBAC), polymethyl methacrylate (PMMA), and polyethylene oxide (PEO).

As an example, when EAA is selected as the thermoplastic polymer, the EAA must have sufficient carboxyl groups to be functionally compatible with the starch. The pendant carboxyl groups supplied by the acrylic acid component associate with the hydroxyl groups provided by the starch to account for the compatibility. These same carboxyl groups contribute to the water dispersibility of the copolymer.

If an acidic copolymer, such as for example EAA is used along with an olefinic polymer like polyethylene to provide the thermoplastic polymeric component, a neutralizer for the acid component of the copolymer is preferably added before forming the intended article. The preferred neutralizing agent is ammonia in either its anhydrous or aqueous form. The amount added should be equal to at least about one-half equivalent per equivalent of acid in the EAA. Normally, the level of ammonia addition will be between about 0.8% to 5% by weight based on the dry weight of the starch-EAA-PE formulation. The ammonia is thought to form an ammonium salt with the acid. Thus, other suitable neutralizing agents include simple amines that are substantially similar to ammonia in their tendency to form salts with organic acids. Sodium hydroxide and potassium hydroxide also can be used.

The stabilizing component is normally an anti-oxidant and is incorporated into the thermoplastic component during its manufacture. Preferred anti-oxidants are the hindered phenols such as benzenepropanoic acid, 3,5-bis(1,1-dimethyl ethyl)-4-hydroxy-octadecyl ester (Irganox 1076 from Ciba-Geigy). This latter compound is most useful for stabilizing low-density polyethylene polymers but can also be used to stabilize other and thermoplastic polar polymers.

After the directly biodegradable component has undergone at least partial decomposition in stage one, second stage oxidative breakdown is accelerated. This is brought about by the oxidizable component which contains a sufficient number of carbon-carbon double bonds to render the thermoplastic polymeric component susceptible to chemical attack. Preferred oxidizable components have at least one carbon-carbon double bond and include any unsaturated fatty acid and/or a fatty acid ester such as vegetable oils, including soya oil, corn oil, olive oil, rapeseed oil, soybean oil, cotton seed oil, sunflower oil, peanut oil and linseed oil, or other unsaturated materials, such as natural or synthetic rubber. This chemical reaction generates a peroxide and/or a hydroperoxide that initiates further chemical breakdown through oxidative breakdown of carbon-to-carbon linkages in the chemically saturated polymers and in the polar polymers. The oxidizable component can comprise up to 15% by weight of the synthetic polymeric compound. Preferred levels range from 0.25% to 5.0%, by weight with the best degradation results achieved at levels ranging from 0.25% to 2.0%, by weight. At this most preferred level, little if any discoloration is noticed in the final product.

Second stage oxidative reaction is preferably initiated by a first transition metal component comprising an iron compound such as ferric hydroxy stearate, which is soluble in the synthetic thermoplastic compound. As a result of the action of the salt of the first transition metal, a peroxide and/or a hydroperoxide is generated which initiates the break down of the polymer chain into its low molecular weight constituents. A second transition metal component can further be added comprising a copper compound which acts as a catalyst with the iron compound to enhance degradation through the second stage.

The first transition metal component preferably comprises an iron compound generally having the formula X—Fe, where X represents one or more ligands. This iron compound may additionally be coupled to a further ligand Y. Fe may designate iron in any known valency. The ligand X may be an inorganic or organic acid radical or likewise another ligand bonded in a complex. For purposes of illustration, examples of suitable ligands X include OH—, Cl—, Br—, I—, oxalate-, H-citrate-, $NO_2$, $N_3$—, EDTA or carbonyl, nitrosyl or porphyrin radical. Examples of suitable ligands Y include carboxylic acid ions of aromatic or aliphatic monocarboxylic acid or dicarboxylic acids with the aliphatic carboxylic acid preferably having 10 to 20 carbon atoms. Ligand Y serves in general to increase the solubility of the iron compound X—Fe in the synthetic polymeric compound. The iron compound more preferably is comprised of ferric stearate and/or ferric hydroxy stearate present in the synthetic thermoplastic compound in an amount from about 0.01% to 1.0% by weight, and more preferably in an amount from about 0.1% to 0.5% by weight. It is understood that the ranges listed herein are for purposes of illustration. The amount listed for the upper limits is based on economics. Therefore, the first transition metal component may be present in the concentration in amounts greater than those listed although, a saturation limit is reached at which further addition does not provide greater effectiveness. The minimum value listed provides minimum measurable improvements in chemical degradation of the polymeric components.

The second transition metal component of the synthetic thermoplastic compound acts as a catalyst with the first transition metal component to enhance oxidation during the second stage. The second transition metal component may comprise a complex material having the general formula Z'—Me, wherein Me designates a transition metal other than iron if iron is the first transition metal and Z' designates one or more ligands. For purposes of illustration only and, not limitation, examples of the Z' ligands include OH—, Cl—, Br—, I—, oxalate, H-citrate-, NO—$_2$, $N_3$—, EDTA, as well as carboxylic acid ions of aromatic or aliphatic monocarboxylic or dicarboxylic acids with the alphatic carboxylic acid preferably having 10 to 20 carbon atoms. The preferred transition metals comprising Me are the transition metals of the first transition metal row in the periodic table, and more preferably copper and vanadium. The most preferred second transition metal component is copper stearate, present in the synthetic thermoplastic compound in an amount from about 0.005% to 0.1% by weight, and more preferably cupric stearate in an amount from about 0.01% to 0.06% by weight.

An aromatic ketone is also preferably added to the polymer compound. The ketone component has a synergistic effect on the oxidation of the oxidizable component which generate peroxides and/or hydroperoxides that initiate breakdown of the C—C bonds with thermoplastic polymer. In addition, the ketone component renders the thermoplastic polymeric compound susceptible to degradation under the action of sunlight and/or ultraviolet light and heat. The aromatic ketone component can include benzophenone, anthraquinone, anthrone or derivatives such as acetylbenzophenone or 4-ocytl benzophenone. The more preferred aromatic ketone is benzophenone which is present in the composition in an amount of from about 0.01% to about 0.7% by weight and more preferably in an amount from about 0.02% to about 0.15% by weight.

During the second stage of degradation, the thermoplastic polymer is chemically broken down to low molecular weight constituents under the influence of ultraviolet light, sunlight or heat or under heat generated during appropriate environmental conditions. This occurs when free radicals such as for example OH* are formed due to the presence of iron ions, which can react with the polymers forming other free radicals. These free radicals are extremely reactive and can among other things react further with oxygen, with other chains, iron ions, and the like. Polymer chains are thus split and small chains with or without oxygen-containing groups, such as alcohols, ketones, etc. are formed. During this process, iron ions act both as an initiator and as a reaction promoter since iron-(III) hydroxide complexes are highly reactive. This can be illustrated by the following equations:

$$Fe^{3+} + OH^- \rightarrow [FeOH]^{2+} \rightarrow Fe^{2+} + OH^* \quad (1)$$

The observed catalytic effect of the transition metal compounds, copper and vanadium compounds, is probably attributed to an acceleration of the $Fe^{3+} ---Fe^{2+} ---Fe^{3+}$ cycle. Without these compounds, the $Fe^{2+}$ formed according to equation (1) may be reoxidized by other free radicals or other intermediates at the expense of chain splitting as for example, shown in the following equation:

$$Fe^{2+} + ROOH \rightarrow Fe^{3+} + OH^- + RO^* \quad (2)$$

In the presence of copper compounds, the $Fe^{2+}$ formed is reoxidized faster according to the following equation:

$$Fe^{2+} + Cu^{2+} \rightarrow Fe^{3+} + Cu^+ \quad (3)$$

and $Cu^+$ ions are reoxidized very fast to $Cu^{2+}$ ions by free radicals as follows:

$$Cu^+ + RO^* \rightarrow Cu^{2+} + RO^- \quad (4)$$

This process repeats itself as long as the polymer is exposed to ultraviolet light and sunlight or to heat such as occurs in a landfill or in a composting environment.

As the second stage progresses, the long chain polymers are successively broken into ever shorter oxygen-containing polymer chains. The chemically degradable polymeric material then enters the third stage where under the effects of microorganisms such as bacteria, fungi and/or enzymes naturally present under composting conditions or in contact with the soil, complete degradation to innocuous compounds with a $CO_2$, $H_2O$ and bio-mass occur.

It will be understood that the foregoing description is by way of example only and that such modifications and/or changes as may suggest themselves to those skilled in the art are intended to fall within the scope of the present invention as defined by the appended claims.

What is claimed is:

1. A synthetic thermoplastic polymeric compound which is degradable into innocuous products under the action of naturally occurring decomposition forces comprised of heat, underwater disposal, and/or microbiological organisms, which comprises:
   (a) a thermoplastic polymeric component formed of long chain carbon-to-carbon linkages;
   (b) a biodegradable component mixed with the thermoplastic component, wherein the naturally occurring decomposition forces effect decomposition removal of the biodegradable component to increase the exposure area of the carbon-to-carbon linkages of the thermoplastic polymeric component;
   (c) an oxidizable component that reacts with the exposed carbon-to-carbon linkages of the thermoplastic component under the action of the naturally occurring forces to sever the linkages and effect degradation of the thermoplastic polymeric component;
   (d) a first transition metal component that is soluble in the synthetic thermoplastic polymeric compound and which serves as an initiator for the reaction of the oxidizable component;
   (e) a second transition metal component which acts as a catalyst with the first transition metal component to enhance degradation of the thermoplastic polymeric component;
   (f) oxidation promoting component which in conjunction with the first and second transition metal components enhances the action of the oxidizable component to degrade the carbon-to-carbon linkages of the thermoplastic polymeric component under the action of the naturally occurring forces; and
   (g) a non-metal. Containing stabilizing component, wherein the stabilizing component comprises a hindered phenol that retards commencement of the degradation process until the polymeric component is subjected to the naturally occurring decomposition forces.

2. The thermoplastic compound of claim 1 wherein the biodegradable component is a polysaccharide.

3. The thermoplastic compound of claim 1 wherein the oxidizable component generates a peroxide or a hydroperoxide and is selected from the group consisting of a fatty acid, a fatty acid ester, a natural fat, and mixtures thereof.

4. The thermoplastic compound of claim 3 wherein the oxidizable component is present in the composition in an amount of up to about 15%, by weight.

5. The thermoplastic compound of claim 1 wherein the first transition metal component is ferric hydroxy stearate.

6. The thermoplastic compound of claim 1 wherein the second transition metal component is cooper stearate.

7. The thermoplastic compound of claim 1 wherein the oxidation promoting component comprises an aromatic ketone.

8. The thermoplastic compound of claim 7 wherein the aromatic ketone is benzophenone.

9. The thermoplastic compound of claim 8 wherein the benzophenone is present in the compound in an amount of from about 0.01% to about 0.2% by weight.

10. The thermoplastic composition of claim 1 where the hindered phenol is selected from the group consisting of benzenepropanoic acid and 3,5-bis(1,1-dimethyl ethyl)-4-hydroxy-octadecyl ester.

11. The thermoplastic compound of claim 1 wherein the thermoplastic polymeric compound comprises a polar polymer.

12. The thermoplastic compound of claim 11 wherein the thermoplastic polymeric component is selected from the group consisting of polyurethane (PU), polystyrene (PS), polyolefins, ethylene/vinyl acetate-copolymers (EVA), ethylene/vinyl alcohol-copolymer (EVAL), ethylene/acrylic acid-copolymers (EAA), ethylene/methyl acrylate-copolymers (EMAC), ethylene methacrylic acid copolymer (EMAA), ethylene vinyl alcohol (EVAL), polyinyl alcohol (PVOH), ethylene vinyl alcohol carbon monoxide copolymer (EVACO), ethylene butylacrylate (EBAC), polymethyl methacrylate (PMMA) and polyethylene oxide (PEO).

13. The thermoplastic compound of claim 5 wherein the ferric hydroxy stearate consisting of the first transition metal component is present in the compound in an amount of from between about 0.1% to about 0.5% by weight.

14. The thermoplastic compound of claim 6 wherein the copper stearate consisting of the second transition metal component is present in the compound in an amount of from between about 0.005% to about 0.1 by weight.

15. The thermoplastic compound of claim 1 wherein the oxidation promoting component further serves as a photodegradation enhancer for the degradation of the carbon-to-carbon linkages comprising the thermoplastic polymeric component under the action of ultraviolet light and/or sunlight.

16. A synthetic thermoplastic polymeric compound which is degradable into innocuous products under the action of naturally occurring decomposition forces comprised f heat, underwater disposal, and/or microbiological organisms, which comprises:
   (a) a thermoplastic polymeric component formed of long chain carbon-to-carbon linkages;
   (b) a biodegradable component mixed with the thermoplastic component, wherein the naturally occurring decomposition forces effect decomposition removal of the biodegradable component to increase the exposure area of the carbon-to-carbon linkages of the thermoplastic polymeric component;
   (c) an oxidizable component that reacts with the exposed carbon-to-carbon linkages of the thermoplastic component under the action of the naturally occurring forces to sever the linkages and effect degradation of the thermoplastic polymeric component;
   (d) a transition metal component that is soluble in the synthetic thermoplastic polymeric compound and which serves as an initiator for the reaction of the oxidizable component; and
   (e) a non-metal containing stabilizing component, wherein the stabilizing component comprises a hindered phenol that retards commencement of the degradation process until the polymeric component is subjected to the naturally occurring decomposition forces.

17. The thermoplastic compound of claim 16 further including an oxidation promoting component which in conjunction with the transition metal component enhances the action of the oxidizable component to degrade the carbon-to-carbon linkages of the thermoplastic polymeric component under the action of the naturally occurring forces.

18. The thermoplastic compound of claim 16 wherein the biodegradable component is a polysaccharide.

19. The thermoplastic compound of claim 16 wherein the oxidazable component generates a peroxide or a hydroperoxide and is selected from the group consisting of a fatty acid, a fatty acid ester, a natural fat, and mixtures thereof.

20. The thermoplastic compound of claim 19 wherein the oxidizable component is present in the composition in an amount of up to about 15%, by weight.

21. The thermoplastic compound of claim 16 wherein the transition metal component is ferric hydroxy stearate.

22. The thermoplastic compound of claim 16 wherein the oxidation promoting component comprises an aromatic ketone.

23. The thermoplastic compound of claim 22 wherein the aromatic ketone is benzophenone.

24. The thermoplastic compound of claim 23 wherein the benzophenone is present in the compound in an amount of from about 0.01% to about 0.2% by weight.

25. The thermoplastic compound of claim 24 wherein the hindered phenol is selected from the group consisting of and 3,5-bis(1,1-dimethyl ethyl)-4-hydroxyoctadecyl ester and benzenepropanoic acid.

26. The thermoplastic compound of claim 16 wherein the thermoplastic polymeric component comprises a polar polymer.

27. The thermoplastic compound of claim 25 wherein the thermoplastic polymeric component is selected from the group consisting of polyurethane (PU), polystyrene (PS), polyolefins, ethylene/vinyl acetate-copolymers (EVA), ethylene/vinyl alcohol-copolymer (EVAL), ethylene/acrylic acid-copolymers (EAA), ethylene/methyl acrylate-copolymers (EMAC), ethylene methacrylate acid copolymer (EMAA), ethylene vinyl alcohol (EVAL), polyvinyl alcohol (PVOH), ethylene vinyl alcohol carbon monoxide copolymer (EVACO), ethylene butylacrylate (EBAC), polymethyl methacrylate (PMMA) and polyethylene oxide (PEO).

28. The thermoplastic compound of claim 16 wherein the ferric hydroxy stearate consisting of the transition metal component is present in the compound in an amount of from between about 0.1% to about 0.5% by weight.

* * * * *